United States Patent
Laraqui et al.

(10) Patent No.: US 9,578,598 B2
(45) Date of Patent: Feb. 21, 2017

(54) NETWORK NODE AND METHOD PERFORMED BY A NETWORK NODE FOR CONTROLLING CONNECTIVITY OF A RADIO RESOURCE UNIT TO A BASE BAND UNIT

(71) Applicant: TELEFONAKTIEBOLAGET L M ERICSSON (PUBL), Stockholm (SE)

(72) Inventors: Kim Laraqui, Solna (SE); Zere Ghebretensaé, Trångsund (SE); Peter Öhlén, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/428,737

(22) PCT Filed: Sep. 21, 2012

(86) PCT No.: PCT/SE2012/050999
§ 371 (c)(1),
(2) Date: Mar. 17, 2015

(87) PCT Pub. No.: WO2014/046581
PCT Pub. Date: Mar. 27, 2014

(65) Prior Publication Data
US 2015/0237571 A1 Aug. 20, 2015

(51) Int. Cl.
*H04W 48/20* (2009.01)
*H04W 24/10* (2009.01)
(Continued)

(52) U.S. Cl.
CPC ............. *H04W 48/20* (2013.01); *H04W 24/10* (2013.01); *H04W 36/0011* (2013.01);
(Continued)

(58) Field of Classification Search
CPC .. H04W 48/20; H04W 24/10; H04W 36/0011; H04W 36/0061; H04W 36/30; H04W 88/08
See application file for complete search history.

(56) References Cited

U.S. PATENT DOCUMENTS

| 7,937,110 B2 * | 5/2011 | Wu ........................ H04W 88/08 455/550.1 |
| 2006/0199584 A1 * | 9/2006 | Bergstrom ............ H04W 36/18 455/436 |

(Continued)

FOREIGN PATENT DOCUMENTS

| EP | 1713290 A1 | 10/2006 |
| EP | 1954075 A1 | 8/2008 |

(Continued)

OTHER PUBLICATIONS

Namba, et al., Colony-RAN Architecture for Future Cellular Network, Future Network & MobileSummit, 2012 Conference Proceedings, Jul. 4, 2012.

(Continued)

*Primary Examiner* — Curtis A Alia

(57) ABSTRACT

A method performed by a network node in a communication network is disclosed for controlling connectivity of a radio resource unit (RRU) to a baseband unit (BBU) in the communications network. The communication network comprises a plurality of RRUs and a plurality of BBUs, each RRU being connected to a BBU via a distribution network. The method comprises receiving information indicating that a connection of a first RRU to a first BBU is to be controlled and triggering a user equipment (UE) connected to the first RRU to perform measurements on signals from neighboring RRUs and to send a report of the performed measurements to the communications network. The method further comprises receiving the report of the performed measurements, (Continued)

and selecting a BBU, out of the plurality of BBUs, to which the first RRU is to be connected, based on the report of performed measurements and on information regarding to which of the plurality of BBUs the neighboring RRUs are connected.

14 Claims, 3 Drawing Sheets

(51) Int. Cl.
  *H04W 36/00* (2009.01)
  *H04W 36/30* (2009.01)
  *H04W 88/08* (2009.01)
(52) U.S. Cl.
  CPC ....... *H04W 36/0061* (2013.01); *H04W 36/30* (2013.01); *H04W 88/08* (2013.01)

(56) References Cited

U.S. PATENT DOCUMENTS

| | | | |
|---|---|---|---|
| 2012/0039299 A1 | 2/2012 | Teyeb | |
| 2012/0063361 A1* | 3/2012 | Zhao | H04W 8/005 370/254 |
| 2012/0155446 A1* | 6/2012 | Machida | H04W 52/0232 370/338 |
| 2012/0208584 A1* | 8/2012 | Liao | H04B 17/12 455/509 |
| 2012/0224541 A1* | 9/2012 | Yoshiuchi | H04W 16/10 370/329 |

FOREIGN PATENT DOCUMENTS

| | | |
|---|---|---|
| EP | 2469940 A2 | 6/2012 |
| EP | 2498569 A1 | 9/2012 |
| JP | 2009296204 A | 12/2009 |
| JP | 2010524366 A | 7/2010 |
| WO | 2010087031 A1 | 8/2010 |
| WO | 2012087206 A1 | 6/2012 |

OTHER PUBLICATIONS

C-RAN, The Road Towards Green RAN, Version 2.5, China Mobile Research Institute, Oct. 2011.
Kordybach, et al., Self Organizing Networks (SON), in LTE for UMTS: Evolution to LTE-Advanced, Mar. 4, 2011.
Namba, et al., Colony-RAN Architecture for Future Cellular Network, Future Network & Mobile Summit 2012 Conference Proceedings 2012, Jul. 4, 2012.
Namba, et al., BBU-RRH Switching Schemes for Centralized RAN, 2012 7th International ICST Conference on Communications and Networking in China (CHINACOM), Aug. 8, 2012.
C-RAN, The Road Towards Green RAN, White Paper, Version 2.5, Oct. 2011.
Kordybach, et al., Self Organizing Networks (SON), LTE for UMTS: Evolution to LTE-Advanced, Mar. 4, 2011.

* cited by examiner

NETWORK NODE AND METHOD PERFORMED BY A NETWORK NODE FOR CONTROLLING CONNECTIVITY OF A RADIO RESOURCE UNIT TO A BASE BAND UNIT

TECHNICAL FIELD

The present disclosure relates generally to a network node and a method performed by a network node in a communication network, for controlling connectivity of a radio resource unit, RRU, to a baseband unit, BBU, in the communication network.

BACKGROUND

A radio base station (RBS) of a communication network comprises antenna, radio frequency (RF) units for analogue to digital conversion of signals received at the antenna and for digital to analogue conversion of signals to be transmitted from the antenna, frequency conversion units, base band (BB) signal processing units etc. Historically, the RF units, frequency conversion units and BB signal processing units are placed physically together, but divided from the antenna. For a macro RBS, for example, the antenna may be placed on the roof of a building, for transmitted signals to be able to reach rather far away, and the rest of the RBS, e.g. RF units, frequency conversion units and BB signal processing units, may be placed in the basement. For leading analogue signals received at the antenna, and analogue signals to be transmitted from the antenna between the antenna and the rest of the RBS, rather expensive coaxial cables are needed. If, for example, cheaper twisted-pair wires are used, there is a risk that the signal will be degraded. This means that the distance between the antenna and the rest of the RBS cannot be especially long.

In more recent development, the RBS has been divided into a radio resource unit (RRU) and a base band unit (BBU), wherein the RRU comprises the RF units and the BBU comprises BB signal processing units. The RRU could be made rather small and is therefore placed together with the antenna. The BBU could be placed in a central station, such as in a basement of a building. Since signals between the RRU and the BBU can be sent digitally, transmission lines such as twisted-pair copper cables or optical fibers can be used, with techno-economic gains compared to heavy and expensive coaxial cables. This also means that there can be a longer distance between the RRU and the BBU, 10's of km, and therefore many BBUs can be placed together in fewer spots, with potential site simplifications for operators.

Especially, in dense urban areas, a larger amount of small cell RRUs need to be deployed as well as macro cell RRUs. An economically advantageous solution is then to concentrate the BBUs even more to hub sites. The hub sites then have a number of BBUs that can serve a larger number of RRUs. Normally one BBU serves more than one RRU. The concentration of BBUs in a hub site can vary, a hub site serving anything from a dozen to hundred of RRUs, or even thousands of RRUs, as suggested in the Chine Mobile concept of a centralized Radio Access Network (RAN) solution. In order to be able to connect such a large amount of RRUs to BBUs, and not the least, to achieve a scalable solution, i.e. such that it is possible to dynamically add or delete RRUs to the network, a distribution network is suggested between the RRUs and the BBUs. The distribution network may be an optical distribution network (ODN). For an architecture wherein RRUs are connected to BBUs via a distribution network, it is necessary to control connectivity of RRUs to BBUs, or connections between RRUs and BBUs.

SUMMARY

It is an object of the invention to address at least some of the problems and issues outlined above. More specifically, it is an object to control connectivity of RRUs to BBUs in a communication network wherein RRUs are connected to BBUs via a distribution network. It is possible to achieve these objects and others by using a method and a network node as defined in the attached independent claims.

According to one aspect, a method performed by a network node in a communication network is provided, the method being arranged for controlling connectivity of a radio resource unit, RRU, to a baseband unit, BBU, in the communications network. The communication network comprises a plurality of RRUs and a plurality of BBUs, wherein each RRU is connected to a BBU via a distribution network. The method comprises receiving information indicating that a connection of a first RRU to a first BBU is to be controlled and triggering a user equipment, UE, connected to the first RRU to perform measurements on signals from neighboring RRUs, and to send a report of the performed measurements to the communications network. The method further comprises receiving the report of the performed measurements, and selecting a BBU, out of the plurality of BBUs, to which the first RRU is to be connected, based on the report of performed measurements and on information regarding to which of the plurality of BBUs the neighboring RRUs are connected.

According to a second aspect, a network node in a communications network is provided, configured to control connection of a radio resource unit, RRU, to a baseband unit, BBU, in the communications network. The communications network comprises a plurality of RRUs and a plurality of BBUs, each RRU being connected to a BBU via a distribution network. The network node comprises a receiving unit configured to receive information indicating that a connection of a first RRU to a first BBU is to be controlled and a triggering unit configured to trigger a user equipment, UE, connected to the first RRU to perform measurements on signals from neighboring RRUs, and to send a report of the performed measurements to the communications network. The network node further comprises a selecting unit configured to select a BBU, out of the plurality of BBUs, to which the first RRU is to be connected, based on the report of performed measurements and on information regarding to which of the plurality of BBUs the neighboring RRUs are connected. Further, the receiving unit is configured to receive the report of the performed measurements.

According to a third aspect, a computer program product is provided comprising computer readable code means, which when run in a network node according to the second aspect causes the network node to perform the corresponding method according to the first aspect.

The above method and apparatus may be configured and implemented according to different optional embodiments that are described in the detailed description below. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
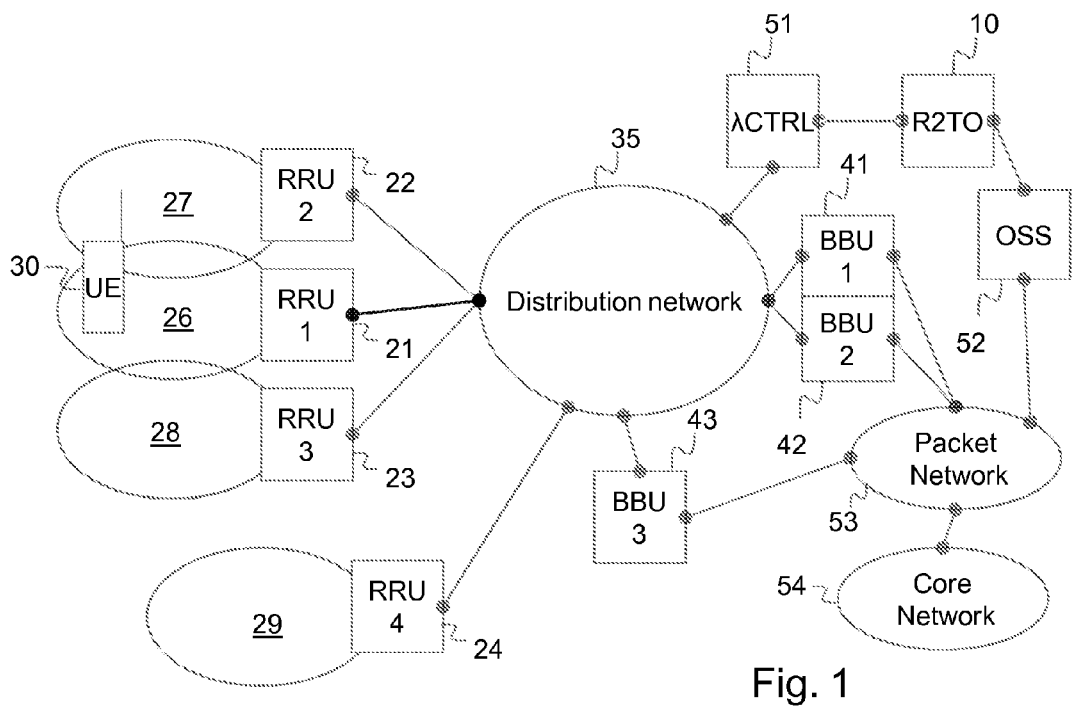
FIG. 1 is a schematic block diagram illustrating an architecture of a communications network, according to some possible embodiments.

Briefly described, a solution is provided in a communication network to control connectivity between RRUs and BBUs, wherein the RRUs are connected to BBUs via a distribution network. In order to connect an RRU to an appropriate BBU in the prior art, meticulous planning is required, both because of capacity issues and because adjacent RRUs should be coordinated and therefore connected to the same or adjacent BBUs.

It would be advantageous if an RRU connected to the network would automatically be connected to a proper BBU. There is a newly suggested solution from the applicant of a new network node called a Lambda Controller (λCTRL) for controlling connectivity over the distribution network, e.g. between RRUs and BBUs. The λCTRL is arranged to set up and tear down paths between RRUs and BBUs over the distribution network, and to keep track of which entities that are interconnected via these paths. The λCTRL is also arranged to discover an RRU that has newly been added to the network. The λCTRL provides a good solution for discovering and setting up a newly added RRU. Although, the newly added RRU is set up to any BBU that has free capacity. To improve usage of capacity of the network and for coordination of BBU-connections of nearby RRUs, the following method is suggested, as an embodiment of the present invention:

A network node, which may be called Remote Radio topology Organizer, R2TO, gets information from the network, e.g. from the λCTRL, that an RRU has been added to the network and connected via a distribution network to a BBU. The R2TO then triggers the BBU to which the RRU was connected to send a measurement report request to a user equipment, UE, connected to the added RRU. The UE is requested to perform measurements on neighboring cells. The performed measurements are then reported to the network, together with identifications of which neighboring cell and/or neighboring RRU each measurement belong to. The measurements may be reported as a standard 3GPP measurement report. The R2TO receives the measurement report from the network, e.g. from an Operation and Support System, OSS, node. The R2TO then evaluates the measurement report to determine which RRUs that are neighbors to the added RRU. The R2TO then checks up, via a network database, to which BBU the neighboring RRUs are connected. Thereafter, the added RRU is connected to the same BBU as the neighboring RRUs are connected to. If the neighboring RRUs are connected to different BBUs, the added RRU may be connected to the BBU to which the majority of the neighboring RRUs are connected. Alternatively, the added RRU may be connected to the BBU to which the neighboring RRU with the highest signal strength is connected.

By such a solution a first RRU may be set up to the same BBU as its neighboring RRUs. This is beneficial since it makes it possible to process adjacent radio signals, i.e. radio signals belonging to neighboring RRUs, and consequently adjacent antennas, in the same BBU. In modern radio communication technologies, such as Orthogonal Frequency Division Multiplex, OFDM, adjacent antennas interfere since they run over the same frequency. Therefore it is important to mitigate this interference. The best way to do that is to process interfering radio signals in the same BBU. By the solution described, an RRU that has been added to the network will be set up to the same BBU as its neighboring RRUs.

FIG. 1 shows an exemplary communication network according to a possible embodiment. The communication network of FIG. 1 comprises four RRUs 21-24. Each of the four RRUs 21-24 provides coverage to a geographical area called a cell 26-29 respectively. UEs (also known as mobile terminals or mobile stations) residing in any of cells 26-29 may be wirelessly connected to the RRUs serving the cell in which the UE resides. In FIG. 1 a UE 30 residing in cell 26 is wirelessly connected to the RRU1 21. A RRU may consist of antenna and RF components, and facilitates to convert analog signals received from the UE into digital signals and to convert digital signals received from a BBU into analog signals to be sent to the UE. The four RRUs are each connected to one of BBUs 41-43 via a distribution network 35. The distribution network 35 is a network that is capable of supporting a protocol used for communication between RRUs and BBUs, such as Common Public Radio Interface, CPRI. The distribution network 35 can comprise micro or milliwave links, copper based links and/or optical links. In large networks, the distribution network may probably be an optical network with support for Wavelength Division Multiplexing, WDM. The BBUs 41-43 are each arranged to perform signal processing on the digital signals received from the RRUs and on digital signals received from other parts of the communication network, such as a core network 54, typically via a packet network 53, and destined to the RRUs. The communication network of FIG. 1 further comprises an Operation and Support System, OSS, node 52. The OSS node is used to manage the communication network units, e.g. RRUs, BBUs, Core network and Packet network. It is also used to manage the UEs.

In order to support the distribution network 35, there is a node called λCTRL 51 in the communication network. As mentioned, the λCTRL 51 is arranged for controlling connectivity over the distribution network 35, e.g. between RRUs and BBUs. The λCTRL is arranged to set up and tear down paths between RRUs and BBUs over the distribution network, and to keep track of which entities that are interconnected via the distribution network. The λCTRL is also arranged to discover an RRU that has newly been added to the network. The λCTRL can also receive and execute connectivity requests from other nodes, such as the R2TO 10.

Figure 2:
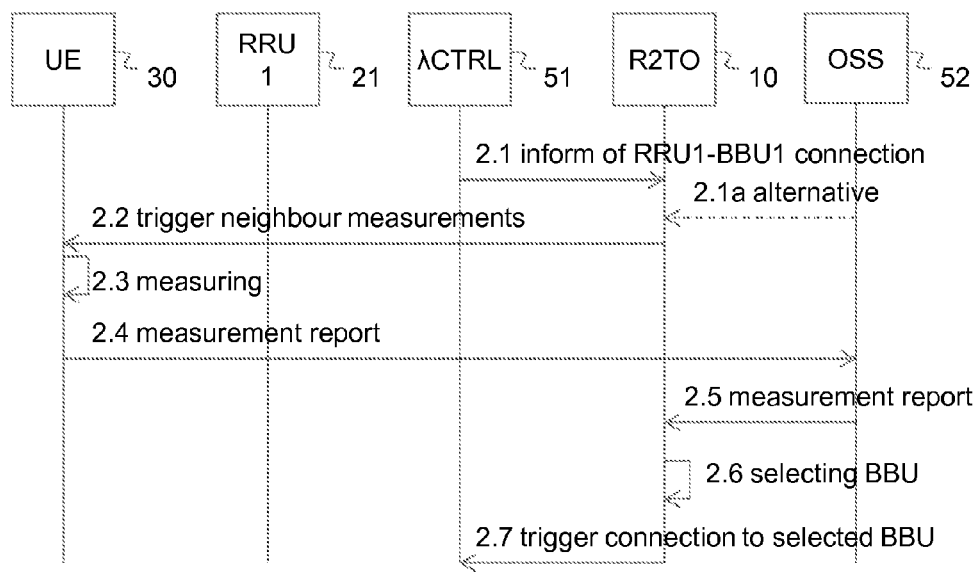
FIG. 2 describes a communication scenario illustrating a method for controlling connection of a radio network node to a communication network according to a possible embodiment.

FIG. 2 describes a communication scenario when implementing a method according to an embodiment, the method being performed by the R2TO 10. The method performs connectivity control of an RRU, such as RRU1 21 to a BBU via the distribution network 35. An advantage of the method is that it improves usage of capacity of the communication network. A further advantage is that it provides coordination of connections to BBUs for nearby RRUs. The method starts by the R2TO 10 receiving a message 2.1 informing of an RRU-BBU connection that needs to be controlled. In the following example we assume that it is a connection between the RRU1 21 and the BBU1 41 that is to be controlled. The message 2.1 may be sent to the R2TO 10 from the λCTRL 51. The λCTRL 51 may be triggered to send the message 2.1 based on that the RRU1 21 has been added to the network, which first triggers the λCTRL 51 to connect the RRU1 21 to any BBU, in this case to BBU1 41, such that the RRU1 21 can start handling connections to UEs in its cell 26. Alternatively, a message 2.1a informing of an RRU-BBU connection that needs to be controlled may be sent by the OSS 52. The information may be received from the OSS via event subscription of OSS information related to new, or added, RRUs or by polling the OSS 52. Alternatively, the information message 2.1 or 2.1a may be sent for any connectivity control reason, e.g. for regularly checking that an RRU is connected to the same BBU as its neighboring RRUs.

When the R2TO 10 has received the information message 2.1 or 2.1a, the R2TO triggers 2.2 the BBU1 41 to request a measurement report comprising neighbor cell measurements from UE 30, which is wirelessly connected to the RRU1 21. Alternatively, the R2TO triggers the OSS 52 to request the BBU1 41 to request a measurement report comprising neighbor cell measurements from UE 30. The report may be a standard measurement report defined by 3GPP, which report is normally used for example for enabling handover. The UE 30 then measures 2.3 on signals received from neighboring RRUs that it can hear. The measurements may be signal strength measurements. The UE then compiles a report of the measurements received from the neighboring RRUs that it has managed to discover. The report may be a standard 3GPP measurement report. The report also comprises some kind of sector/cell /RRU identifiers for being able to identify which RRUs that are neighbors to the RRU1 21. In the example, the UE 30 may receive signals from neighboring RRUs RRU2 22 and RRU3 23. Thereafter, the UE 30 sends the measurement report 2.4 to the network via RRU1 21 and BBU1 41 to the OSS 52. The R2TO 10 then receives 2.5 the measurement report from the OSS 52. Alternatively, the measurement report may take any other possible way in the communication network from the UE 30 to the R2TO 10.

The R2TO 10 then selects 2.6 a BBU, to which the RRU1 21 is to be connected, based on the received measurement report and on information regarding to which of the plurality of BBUs the neighboring RRUs are connected. More specifically, according to an embodiment, the R2TO 10 determines from the measurement report which RRUs that are neighboring RRUs. Further, the R2TO 10 determines, via e.g. a database that the R2TO has access to, to which BBUs the determined neighboring RRUs are connected, and selects the same BBU for the RRU1, as neighboring RRUs are connected to. The information of connections between RRUs and BBUs may be provided by the λCTRL 51. In this example, the R2TO discovers that the neighboring RRUs RRU2 22 and RRU3 23 are both connected to BBU2 42. Consequently, the R2TO 10 selects the BBU2 42 as the BBU to which the RRU1 21 should be connected. If neighboring RRUs are connected to more than one BBU, the BBU may be selected to which the majority of the neighboring RRUs are connected.

Thereafter, the R2TO 10 triggers 2.7 the λCTRL 51 to connect the added RRU to the selected BBU. In this example, the λCTRL 51 triggers RRU1 21 to connect to BBU2 42. In case the same BBU is selected as the added RRU was previously connected to, no triggering has to be performed, of course. In case another BBU is selected, the λCTRL 51 gracefully shuts down the RRU, and then reconnects it to the another BBU. In the example, the RRU1 21 is gracefully shut down, where after the RRU1 is reconnected to the BBU2 42.

The method can also be used to optimize radio configurations during service windows so as to keep the BBU-RRU network up to date with the best combination of RRUs and BBUs. For example, if maintenance is to be performed on a BBU, the method may be performed to select new BBUs for the RRUs that were connected to the BBU that is set on maintenance. The method may also be used in case some RRUs can be shut down during other time windows, e.g. turning off RRUs located in residential areas and turning on RRUs in office areas, during office hours, but using the same BBU resources for both.

Figure 3:
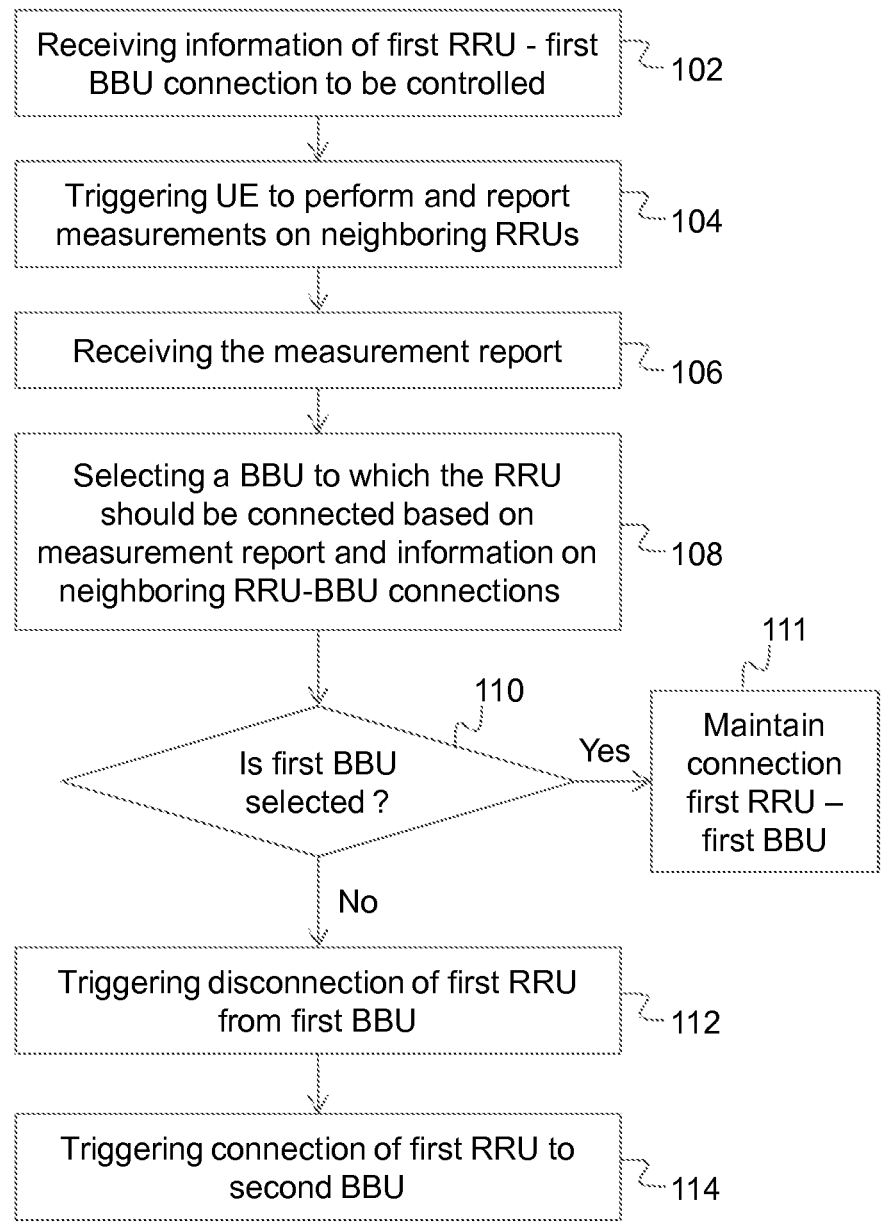
FIG. 3 is a flow chart illustrating a method according to further possible embodiments.

FIG. 3 shows a method according to an embodiment. The method is performed by a network node 10 in a communication network, for controlling connectivity of a radio resource unit, RRU, to a baseband unit, BBU, in the communications network. The communication network comprising a plurality of RRUs 21-24 and a plurality of BBUs 41-43, each RRU being connected to a BBU via a distribution network 35. The method comprises: receiving 102 information indicating that a connection of a first RRU 21 to a first BBU 41 is to be controlled, and triggering 104 a user equipment, UE 30, connected to the first RRU 21 to perform measurements on signals from neighboring RRUs 22, 23, and to send a report of the performed measurements to the communications network. The method further comprises receiving 106 the report of the performed measurements and selecting 108 a BBU, out of the plurality of BBUs 41-43, to which the first RRU 21 is to be connected, based on the report of performed measurements and on information regarding to which of the plurality of BBUs 41-43 the neighboring RRUs 22, 23 are connected.

Neighboring RRUs are RRUs that provide coverage to cells that are in the neighborhood of a cell controlled by the first RRU. The measurements performed on signals from neighboring RRUs may be signal strength measurements.

By such a method it is not necessary to plan configuration of RRU-BBU connections. The method facilitates automatic connection for an added RRU to a suitable BBU, the BBU being suitable in terms of e.g. network planning optimization, and/or handling of signals from neighboring RRUs. When BBUs and RRUs are added to the communication network, the network node (e.g. R2TO) continuously adapts the best topology in connecting RRUs to BBUs. This results in a looser relationship between BBUs and RRUs and BBUs and RRUs can be deployed semi-independently from each other. This in turn will achieve a similar effect on the radio network side as there is today on the core network side, i.e. as Serving GPRS Support Node, SGSN, employed in pool, or Mobile Switching Center, MSC, employed in pool. The method (and the network node described in later embodiments) will also enable much simpler multi-operator solutions, i.e. where two operators share the same infrastructure but use separate frequencies. The network node knows to which operator a cell belongs and can therefore connect the right RRU to the right BBU.

Further, if the measurement report is a standardized report, such as a standardized 3GPP report, existing mechanisms are used in order for the UE to measure neighboring cells. I.e. no change has to be performed at the UE side. The added mechanisms are performed in the network node, which extracts the measurement report from e.g. OSS and calculates best connectivity solution between BBU and RRU.

According to an embodiment, selecting 108 a BBU to which the first RRU 21 is to be connected may further comprise determining from the report of performed measurements which RRUs that are the neighboring RRUs, and determining to which BBU(s) the determined neighboring RRUs are connected, and selecting a BBU to which any of the neighboring RRUs are connected.

According to an embodiment, the report of performed measurements is used to detect which of the plurality of RRUs 21-24 that are the neighboring RRUs.

According to yet another embodiment, the method further comprises, after a BBU has been selected 108, checking 110 if the same BBU as already is used is selected, in this case the first BBU. Further, if the selected BBU is a second BBU 42 different from the first BBU 41, the method comprises: triggering 112 an instruction to disconnect the first RRU 21 from the first BBU 41, and triggering 114 an instruction to connect the first RRU 21 to the second BBU 42.

According to still another embodiment, the method further comprises, if the selected BBU is the first BBU, maintaining 111 the connection of the first RRU 21 to the first BBU 41.

According to a further embodiment, the information indicating that the connection of the first RRU 21 to the first BBU 41 is to be controlled is information indicating that the connection of the first RRU to the first BBU has been established. Such information may be triggered when the connection is established, or newly established, or about to be established, for example, by the λCTRL when the λCTRL has finished establishing the connection.

According to yet another embodiment, the information indicating that the connection of the first RRU 21 to the first BBU 41 is to be controlled is information indicating that the first RRU has been added to the communication network.

Figure 4:
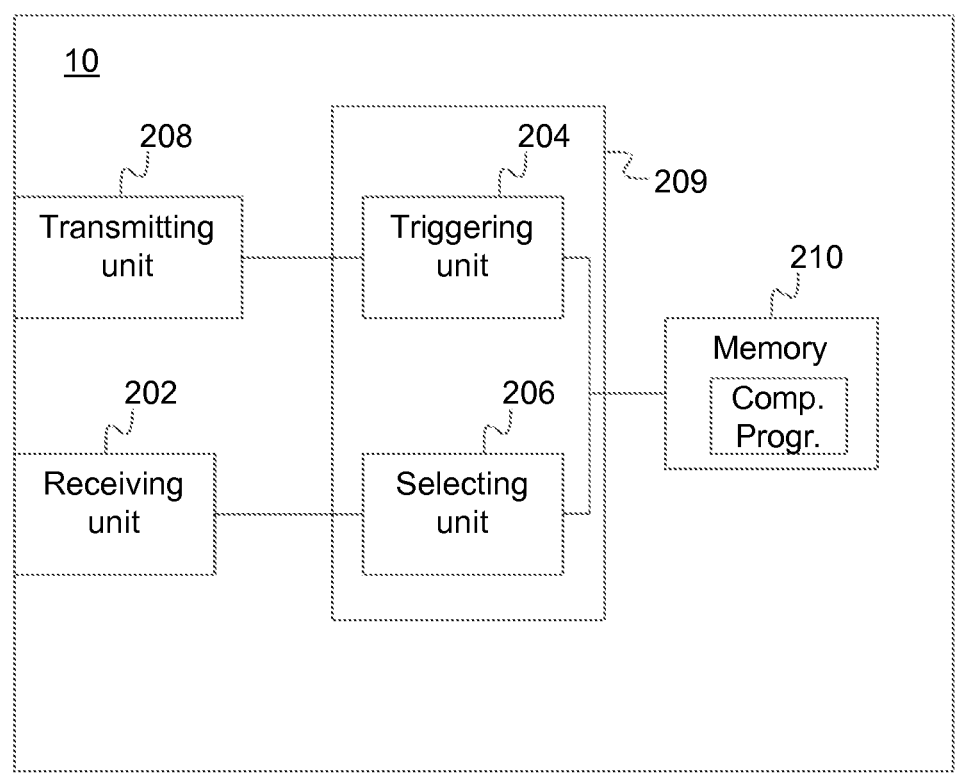
FIG. 4 is a schematic block diagram illustrating a network node in more detail, according to further possible embodiments.

FIG. 4 shows an embodiment of a network node 10, such as an R2TO configured to control connection of a radio resource unit, RRU, to a baseband unit, BBU, in a communications network, wherein the communications network comprises a plurality of RRUs 21-24 and a plurality of BBUs 41-43, each RRU being connected to a BBU via a distribution network 35. The network node 10 comprises a receiving unit 202 configured to receive information indicating that a connection of a first RRU 21 to a first BBU 41 is to be controlled, and a triggering unit 204 configured to trigger a user equipment, UE 30, connected to the first RRU 21 to perform measurements on signals from neighboring RRUs 22, 23, and to send a report of the performed measurements to the communications network. The network node 10 further comprises a selecting unit 206 configured to select a BBU, out of the plurality of BBUs 41-43, to which the first RRU 21 is to be connected, based on the report of performed measurements and on information regarding to which of the plurality of BBUs 41-43 the neighboring RRUs 22, 23 are connected. Further, the receiving unit 202 is configured to receive the report of the performed measurements.

The network node 10 further comprises a transmitting unit 208 for transmitting signals to other units in the communication network, such as the λCTRL 51 and the OSS 52. Further, the triggering unit 204 and the selecting unit 206 may be arranged as units of a processor 209 of the network node 10. The network node 10 may also comprise a memory 210 in which a computer program may be stored. The computer program, or computer program product, comprises computer readable code means, which when run in the network node 10, e.g. in the processor 209 of the network node 10, causes the network node to perform the method as described in any of the embodiments of this disclosure.

According to an embodiment, the selecting unit 206 is configured to select a BBU to which the first RRU 21 is to be connected by determining from the report of performed measurements which RRUs that are the neighboring RRUs, and determining to which BBU(s) the determined neighboring RRUs are connected, and selecting a BBU to which any of the neighboring RRUs are connected.

According to another embodiment, the selecting unit 206 is configured to use the report of performed measurements to detect which of the plurality of RRUs 21-24 that are the neighboring RRUs 22, 23.

According to yet another embodiment, the triggering unit 204 is configured to trigger an instruction to disconnect the first RRU 21 from the first BBU 41 and to trigger an instruction to connect the first RRU 21 to the second BBU 42, if the selected BBU is a second BBU 42 different from the first BBU 41.

According to yet another embodiment, the triggering unit 204 is configured to maintain the connection of the first RRU 21 to the first BBU 41, if the selected BBU is the first BBU 41.

According to another embodiment, the information indicating that the connection of the first RRU 21 to the first BBU 41 is to be controlled is information indicating that the connection of the first RRU to the first BBU has been established.

According to another embodiment, the information indicating that the connection of the first RRU 21 to the first BBU 41 is to be controlled is information indicating that the first RRU has been added to the communication network.

As mentioned, the network node 10 may be a node called an R2TO node. Although, the network node may be any kind of node in the network that may perform a method according to any of the described embodiments. For example, the network node may be the λCTRL node 51 which in that case is equipped with the units as described in FIG. 10 to be able to perform the described embodiments of the method.

By the disclosed embodiments of methods and network nodes, an RRU can establish connectivity to an appropriate BBU automatically. For example, an RRU can just be plugged into the communication network and a connection to an appropriate BBU will be established. This may be particularly interesting in dense urban area networks with many small cells, where the volume of small RRUs deployed and the cost-pressure in deploying them, calls for simple network deployment. Also, in such dense urban area networks, the network may re-occurringly be added with new RRUs, which calls for an easy deployment of such RRUs. Further, the disclosed embodiments and methods may support both multi-vendor RRU/BBU and multi-operator RRU/BBU.

According to another embodiment, the RRUs are reconnected due to BBU outage or failure to connectivity to the BBU.

While the solution has been described with reference to specific exemplary embodiments, the description is generally only intended to illustrate the inventive concept and should not be taken as limiting the scope of the solution. The solution is defined by the appended claims.

The invention claimed is:

1. A method performed by a network node in a communication network, for controlling connectivity of a radio resource unit (RRU) to a baseband unit (BBU) in the communications network, the communication network comprising a plurality of RRUs and a plurality of BBUs, each RRU being connected to a BBU via a distribution network, a first RRU having been added to the communication network and connected to a first BBU, the method comprising:

receiving information indicating that a connection of the first RRU to the first BBU is to be controlled in response to the first RRU having been added;

in response to receiving the information, triggering a user equipment (UE) connected to the first RRU to perform measurements on signals from neighboring RRUs, and to send a report of the performed measurements to the communications network;

receiving the report of the performed measurements; and selecting a second BBU, out of the plurality of BBUs, to which the first RRU is to be connected, based on the report of performed measurements and on information regarding to which of the plurality of BBUs the neighboring RRUs are connected.

2. The method according to claim 1, wherein selecting a second BBU to which the first RRU is to be connected further comprises determining from the report of performed measurements which RRUs that are the neighboring RRUs, and determining to which BBU(s) the determined neighboring RRUs are connected, and selecting a BBU to which any of the neighboring RRUs are connected.

3. The method according to claim 1, wherein the report of performed measurements is used to detect which of the plurality of RRUs that are the neighboring RRUs.

4. The method according to claim 1, further comprising, if the selected BBU is a second BBU different from the first BBU:

triggering an instruction to disconnect the first RRU from the first BBU; and triggering an instruction to connect the first RRU to the second BBU.

5. The method according to claim 1, further comprising, if the selected BBU is the first BBU, maintaining the connection of the first RRU to the first BBU.

6. The method according to claim 1, wherein the information indicating that the connection of the first RRU to the first BBU is to be controlled is information indicating that the connection of the first RRU to the first BBU has been established.

7. A non-transitory computer-readable medium comprising instructions which when executed by a processor on a network node, cause the network node to perform the method of claim 1.

8. A network node in a communications network, configured to control connection of a radio resource unit (RRU) to a baseband unit (BBU) in the communications network, the communications network comprising a plurality of RRUs and a plurality of BBUs, each RRU being connected to a BBU via a distribution network, a first RRU having been added to the communication network and connected to a first BBU, the network node comprising:

a processor configured to;

receive information indicating that a connection of the first RRU to the first BBU is to be controlled in response to the first RRU having been added;

in response to receiving the information, trigger a user equipment (UE) connected to the first RRU to perform measurements on signals from neighboring RRUs, and to send a report of the performed measurements to the communications network; and select a second BBU, out of the plurality of BBUs, to which the first RRU is to be connected, based on the report of performed measurements and on information regarding to which of the plurality of BBUs the neighboring RRUs are connected, and wherein the processor is further configured to receive the report of the performed measurements.

9. The network node according to claim 8, wherein the processor is further configured to select a second BBU to which the first RRU is to be connected by determining from the report of performed measurements which RRUs that are the neighboring RRUs, and determining to which BBU(s) the determined neighboring RRUs are connected, and selecting a BBU to which any of the neighboring RRUs are connected.

10. The network node according to claim 8, wherein the processor is further configured to use the report of performed measurements to detect which of the plurality of RRUs that are the neighboring RRUs.

11. The network node according to claim 8, wherein the processor is further configured to trigger an instruction to disconnect the first RRU from the first BBU and to trigger an instruction to connect the first RRU to the second BBU, if the selected BBU is a second BBU different from the first BBU.

12. The network node according to claim 8, wherein the processor is further configured to maintain the connection of the first RRU to the first BBU, if the selected BBU is the first BBU.

13. The network node according to claim 8, wherein the information indicating that the connection of the first RRU to the first BBU is to be controlled is information indicating that the connection of the first RRU to the first BBU has been established.

14. The network node according to claim 8, wherein the information indicating that the connection of the first RRU to the first BBU is to be controlled is information indicating that the first RRU has been added to the communication network.

* * * * *

UNITED STATES PATENT AND TRADEMARK OFFICE
CERTIFICATE OF CORRECTION

| | |
|---|---|
| PATENT NO. | : 9,578,598 B2 |
| APPLICATION NO. | : 14/428737 |
| DATED | : February 21, 2017 |
| INVENTOR(S) | : Laraqui et al. |

Page 1 of 1

It is certified that error appears in the above-identified patent and that said Letters Patent is hereby corrected as shown below:

In the Specification

In Column 1, Line 6, below Title, insert -- This application is a 371 of International Application PCT/SE2012/050999 filed September 21, 2012, the disclosure of which is fully incorporated herein by reference. --.

In Column 1, Line 59, delete "Chine" and insert -- China --, therefor.

In Column 4, Line 18, delete "a cell" and insert -- cells --, therefor.

In Column 4, Line 21, delete "FIG. 1" and insert -- FIG. 1, --, therefor.

In Column 4, Line 67, delete "example" and insert -- example, --, therefor.

In Column 5, Line 25, delete "used for example" and insert -- used, for example, --, therefor.

In Column 6, Line 26, delete "UE" and insert -- UE, --, therefor.

In Column 7, Line 46, delete "UE" and insert -- UE, --, therefor.

In Column 8, Line 38, delete "FIG. 10" and insert -- FIG. 1 --, therefor.

In the Claims

In Column 10, Line 4, in Claim 8, delete "to;" and insert -- to: --, therefor.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*